United States Patent
Klemba et al.

(10) Patent No.: US 7,055,040 B2
(45) Date of Patent: May 30, 2006

(54) METHOD AND APPARATUS FOR UNIQUELY AND SECURELY LOADING SOFTWARE TO AN INDIVIDUAL COMPUTER

(75) Inventors: Keith S. Klemba, Palo Alto, CA (US); Gilles Leyrat, La Tronche (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 385 days.

(21) Appl. No.: 10/143,080

(22) Filed: May 10, 2002

(65) Prior Publication Data

US 2002/0128975 A1    Sep. 12, 2002

Related U.S. Application Data

(63) Continuation of application No. 09/285,295, filed on Apr. 2, 1999, now abandoned.

(51) Int. Cl.
*H06F 17/60* (2006.01)
(52) U.S. Cl. ............... 713/200; 713/155; 713/156; 713/193; 713/176; 713/168; 713/171; 713/165; 705/51; 705/59; 705/26; 705/52; 705/56; 705/54; 380/30; 380/277; 380/28; 380/278; 380/281; 380/279; 707/10; 709/203; 709/229; 709/219; 709/201
(58) Field of Classification Search ............ 705/57, 705/26, 51–56; 380/4, 25, 28–30, 277–279; 364/403; 713/155, 156, 165, 168, 176, 193, 713/200; 707/10; 709/201, 203, 219, 229
See application file for complete search history.

(56) References Cited

U.S. PATENT DOCUMENTS

| 5,325,430 | A | * | 6/1994 | Smyth et al. ............. 380/4 |
| 5,349,643 | A | * | 9/1994 | Cox et al. ............. 380/25 |
| 5,418,713 | A | * | 5/1995 | Allen ............. 364/403 |
| 5,629,980 | A | * | 5/1997 | Stefik et al. ............. 380/4 |
| 5,841,870 | A | * | 11/1998 | Fieres et al. ............. 713/156 |
| 2002/0002538 | A1 | * | 1/2002 | Ling ............. 705/41 |

* cited by examiner

*Primary Examiner*—James A Reagan

(57) ABSTRACT

A method and apparatus for uniquely and securely loading software to an individual computer includes requesting download of software components to a hardware platform and delivering a token from a token server responsive to the request. The token server is operated by an entity having rights to grant access to the software components. The token is passed to a system that builds software images. The system is operated by an organization that performs delivery of the software. The software components are assembled and decrypted with the system within an enabled secure process. A software image to be loaded onto the platform is created and bound to the hardware platform by encrypting the software image using an application specific encryption technique.

9 Claims, 2 Drawing Sheets

METHOD AND APPARATUS FOR UNIQUELY AND SECURELY LOADING SOFTWARE TO AN INDIVIDUAL COMPUTER

CROSS-REFERENCE TO RELATED APPLICATIONS

This application is a continuation of U.S. patent application Ser. No. 09/285,295, filed Apr. 2, 1999 now abandoned, which is hereby incorporated by reference for all that is disclosed therein.

FIELD OF THE INVENTION

The invention relates to the distribution of computer software. More particularly, the invention relates to a method and apparatus for uniquely and securely loading software to an individual computer.

BACKGROUND

Increasing competitiveness in the personal computer industry makes it essential that personal computers have a reasonable total cost of ownership. Presently, software distribution and software updates account for a large part of total cost of personal computer ownership. This is in part due to the complexity of software distribution, where there are many levels in the software delivery chain, e.g. independent software vendors (ISVs), personal computer manufacturers, various levels of resellers, and finally management information systems (MIS) departments. Each level of software distribution uses different schemes for software loading and updating, thus adding unnecessary confusion and complexity in the delivery chain. This leads to convoluted license agreements and contradictory objectives at all levels in the software distribution supply chain.

For example:
  ISVs need efficient channels for their products, but must make sure that their intellectual property rights are not abused.
  Personal computer manufacturers need extremely efficient software loading processes to maintain profitability, but must accommodate tailor made software pre-loads.
  Resellers must aggressively extend their offerings upstream and downstream to keep their added value and compete with direct model players, but must not lose their relationships with original equipment manufacturer (OEM) vendors.
  MIS departments need strong total cost of ownership (TCO) control, but must offer flexible solutions for their end users.
  Finally, corporate users need a flexible choice of productivity tools, but must comply with end user licensing agreements (EULAs) and corporate rules.

It is not unusual for 70 percent of the software pre-loaded by a computer vendor to be replaced by customer images, either from the computer vendor's pre-loaded software or from a custom made integration of software components. This leads to a waste of time and money in the manufacturing process for a large proportion of systems sold.

At the same time, alternative indirect distribution models (such as Internet-based and shareware models) have emerged, co-existing with both corporate software supply chain models and retail models. All models involve similar steps (e.g. copy, install, evaluate, pay, and use), even if these steps are not taken in the same order and by the same people.

Such alternative distribution models are gaining acceptance at a fast pace because of the increased availability of Internet connections in corporations, and because of the general trend to move towards an information-centric computing environment.

The foregoing is a compelling reason for network based distribution of software to become the preferred software supply mechanism. For example, such distribution bears the flexibility and time effectiveness of on-demand supply, while keeping records of granted licenses. This is what the Microsoft Corporation of Redmond, Wash. has attempted to realize with the Active Directory features provided in the Windows NT5 product, which provides basic software distribution mechanisms as an integral part of the core functions of the future corporate operating system.

However, the NT5 model is limited by at least the following two factors:

First, corporations must re-think their information technology (IT) infrastructure to take full advantage of NT5 Active Directory model, thus requiring significant effort in deployment, which is in contradiction with the primary objective of the MIS department, i.e. to offer stability to the corporate IT environment. As an example, a large proportion of corporate customers (in some cases, 40 percent) still choose to use the Windows for Workgroups operating system, primarily because a large number of custom made applications have been developed for this operating system.

Second, if the NT5 model were to be extended from an intranet environment to an Internet online distribution model, it would require the use of strong security mechanisms to protect the intellectual property of the content owner, as well as the credit/debit information of the content user. Even though NT5 includes much stronger security features than previous operating systems (e.g. by using a Kerberos scheme for access rights management and encryption, as limited by current U.S. export control laws), it still lacks sufficiently strong encryption mechanisms to ensure the complete confidentiality of long lasting information, such as software components and customer credit information. Moreover, it does not provide sufficiently trustworthy mechanisms to protect the content provider from software piracy outside a well protected corporate environment, i.e. in the real world.

Another difficulty with software distribution stems from the fact that the software licensing mechanism is not separated from the software supply process. For example, the party who has a legal agreement with the ISV to distribute the software is not necessarily the most appropriate or economically effective party to supply the software components. This gives rise to at least the following anomalies: Corporate customers may ask their IT suppliers to duplicate their software image even though corporate resellers do not have the right to load full operating systems; the corporate end-user may download software via the Internet from the World Wide Web, sometimes infringing corporate IT rules; and OEMs are asked to load full suites of applications, but do not necessarily have agreements in place with ISVs to do so. This leads to many gray area practices and results in either inefficient processes or software licensing problems.

The IT industry is evolving from a computer-centric model to an information-centric model. In the near future, protecting information assets will be even more crucial to corporate software and systems customers. This requires the use of encryption. While various schemes are known for remotely unlocking software, none of the known schemes are well suited for a software distribution model that encompasses an entire software distribution chain. Rather, such systems are typically confined to a simple client/server model.

It would be advantageous to reduce software pre-load costs and thereby save some of the cost of software pre-load licenses. It would also be advantageous to offer new manufacturing flexibility and to adapt to networked software distribution opportunities, while enhancing the existing software distribution chain.

SUMMARY

The invention provides a method and apparatus for uniquely and securely loading software to an individual computer while reducing software pre-load costs. While a preferred embodiment of the invention makes strong encryption exportable (and thus provides increased flexibility in the software distribution chain), the invention is not an encryption mechanism per se. Rather, the invention provides three fundamental features in an information-centric environment, resulting in heretofore unmet flexibility and security for software delivery.

These three features comprise:

Strong encryption mechanisms that are disabled and selectively enabled at various approved levels of functionality, such that the encryption mechanisms are exportable by the use of these control mechanisms for the distribution of encrypted software components through non-trusted locations (e.g. remote duplication factories, a public repository of software, or a freely distributed DVD or CDROM), thereby permitting a worldwide deployment of secure software distribution facilities, without the governmental complexities associated with cryptography export;

A trusted execution environment, for example a tamper resistant control mechanism that can be implemented at the hardware (e.g. chipset) level, thereby ensuring a high level of trust; and A token-based mechanism, which separates delivery of software from licensing, and can effectively be used as the cornerstone of a software usage control system. In the invention, tokens are used as a means for licensing transactions. Such tokens are used to activate strongly protected software that can be delivered along a completely separated delivery path, especially where such software is disabled, i.e. broken. In the invention, tokens are used both to verify that access rights to the software exist and, uniquely, to repair software that has been intentionally disabled. In the preferred embodiment of the invention, token servers are operated by those organizations that have a license agreement with the ISVs, whereas duplication of software is performed by the most efficient channels.

The foregoing features of the invention can be deployed progressively at all levels of the software delivery value chain, for example:

Upstream, at the distribution centers and channel partners as a manufacturing process that clears up current gray area practices; and Downstream, at the end user level, as a software control usage system, which opens up new areas of software supply mechanisms, such as pay per use, time bound promotions, or leasing.

The invention is advantageous to software developers because it provides a credible anti-piracy system that can be deployed at non-trusted duplication centers, significantly increasing the software developer's revenue. Benefits for software customers include better turn around time with in-house access to a large software repository, decreased cost of software licensing, better TCO because of a stronger control of software loading, and strong hardware based security features on personal computers at close to zero cost. Distribution channels also benefit from use of the invention in the form of increased efficiency by lawfully providing services, such as customer image management, and they achieve a better margin due to a lower manufacturing/distribution cost for the platform.

DETAILED DESCRIPTION

Figure 1:
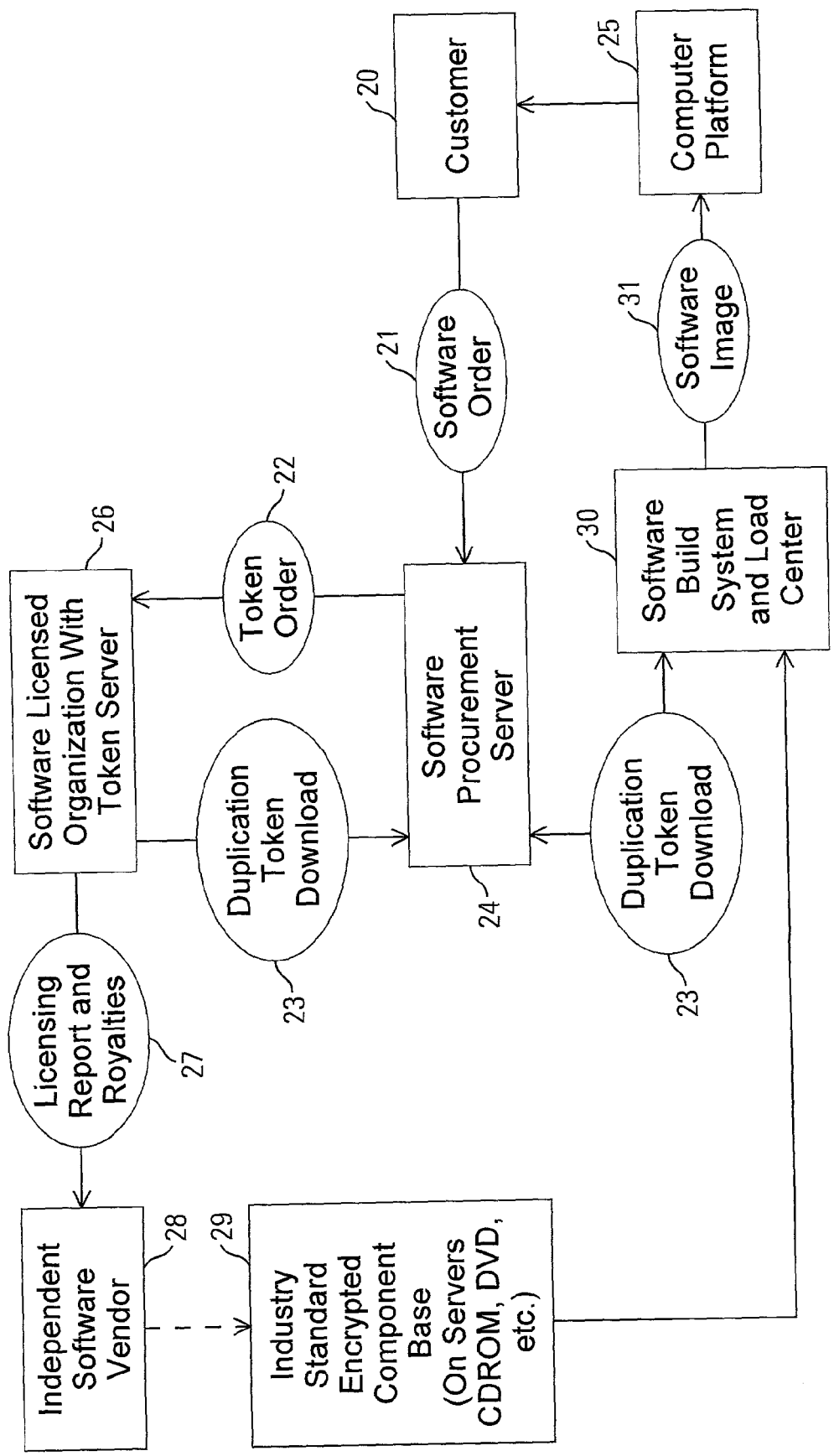
FIG. 1 is a block schematic diagram of a preferred embodiment of the invention using a token based software distribution scheme according to the invention.

One aspect of the invention provides a scheme that circumvents the problem of heterogeneous laws regarding the use and porting of encryption in different parts of the world. This provides a tool for developing products featuring very strong encryption technologies, where such encryption technologies can be made available on a global basis. The invention provides control mechanisms over the use of encryption, by separating encryption algorithms from the rules governing the use of those encryption algorithms. The access right rules are contained within an electronic policy activation token, created and distributed by representatives of local authorities (e.g. licensor, governments) (referred to herein as security domain authorities). This allows for a unique set of encryption algorithms, to be embedded in hardware components (e.g. firmware, chipsets), and activated by a policy activation token, according to the local government regulations.

All cryptographic methods that control access to software lie dormant and unusable as a result of being intentionally disabled, i.e. broken. Only upon the receipt of activation criteria and reenabling data is it possible to resolve such intentional disablement and activate the software. This information is delivered in the policy activation token (PAT). The PAT is a delivery vehicle for access rights such that the set of access right data structures make up the majority of the PAT data structure. The type of PAT and the delivery mechanism determines additional elements of the PAT. PATs are signed to prevent alteration and the PAT signature is authenticated.

There are different types of PATs, including physical and virtual PATs. Given the proper interfaces, all types of PAT can be supported.

A physical PAT is a smart card that contains a set of access rights that are to be considered only while the smart card is physically inserted into its reader. Consequently, the access rights are not transferred out of the physical PAT. By maintaining a constant authentication heartbeat, the system knows that the physical PAT is present. Any access right parameters that are needed can be requested and returned using the heartbeat protocol. The smart card that is serving as the physical PAT may be a multifunction smart card, and thereby contain other useful security features. The physical PAT may be designed to be more or less permanently installed or temporarily installed while the user activates a specific service. Either way, the access rights in the physical PAT are considered available only while the physical PAT is inserted.

A virtual PAT is a token used to securely deliver a set of access rights over a communications link. A virtual PAT is a data structure that contains a set of access rights. The virtual PAT delivery mechanism must not permit replay or diversion.

An underlying principle of the invention lies in the separation of information and the data granting access to that information, as well as the use of a trusted execution environment. This simple, yet extremely powerful principle can easily be transposed to the problem of software distribution. For a discussion of an underlying framework for such a software distribution system, see K. Klemba, R. Merckling, *International Cryptography Framework*, U.S. Pat. No. 5,651,068 (Jul. 22, 1997) and K. Klemba, R. Merckling, *International Cryptography Framework*, U.S. patent application Ser. No. 08/821,325, filed Mar. 21, 1997, the content of which is incorporated herein by this reference thereto.

FIG. 1 is a block schematic diagram of a token based software distribution scheme according to the invention. When a customer 20, e.g. a user, an MIS department, or a reseller representative, requests the download of software components 21 to a platform 25, a token server 26 delivers a token 23, typically as part of a financial transaction 22 via a procurement center 24. The token server 26 is operated by the organization that has a legal agreement with the ISV for the distribution of those particular software components. The token is then passed on to a system 30 that builds software images 31. This system 30 is operated by the organization that performs the delivery of the software. Upon reviewing the information contained in the token 23, this system 30 assembles the appropriate software components from the encrypted component base 29, decrypts them within an enabled secure process, and creates a software image 31 to be loaded onto the platform 25. At this point, the software image 31 is protected using application specific encryption provided by the invention to bind the software image 31 to the hardware platform. The software image 31 is then downloaded to the platform 25, or provided directly to the customer 20. The ISV 28 receives a report 27 from the organization that issued the token and any royalties associated with the licensing of the software components.

When the application is used for the first time, upon agreement of the EULA, the protection mechanism is cleared within a tamper resistant, trusted component of the system on which the application is to run and an unerasable credential is created which records that the software components have been successfully installed. A personal computer manufactured with this process is a standard personal computer, but it is loaded with software using a specific secure pre-load procedure, e.g. BIOS and BIS technology.

The multiple capabilities of use of the token allow implementation of a dynamic process that checks that the software is both genuine and bears a valid certificate at each application start up. This last dynamic process requires modifications of the operating system to establish a trust relationship between the secure process monitoring the use of an application and the trusted component. Such modifications allow the operating system to monitor the credential for service activity.

The invention provides flexibility to accommodate all distribution models, e.g. direct, indirect, retail, Internet, or shareware. Software is readily duplicated and distributed without consideration of license agreements because the token, i.e. a small electronic file, is the physical evidence of the license agreement. The token may therefore follow a separate path from that of the software itself. The software becomes usable only when the token is present. This aspect of the invention provides a powerful mechanism for establishing unencumbered software distribution while reliably securing the software against improper or unauthorized use, sale, or duplication. Thus, use of the invention clears gray area practices by offering an accountable system for license tracking. As an example, resellers may order tokens from ISVs (or their channel) and make lawful customer image duplication without being encumbered by a specific license agreement.

Implementation of the invention does not necessitate a profound change of the economic and the money flow model of software distribution, yet provides the flexibility to move towards new distribution models progressively. This is because use of the invention clearly separates the value added by software license procurement from the value added by image loading and system supply.

The invention provides a common on-line software distribution mechanism that can be deployed at factory sites, at resellers sites (first and second tier), within corporations, and even at individual end-user locations. This is made possible by the high level of trust induced by the use of the invention's security mechanisms, e.g. tamper resistant, hardware-based security.

More specifically, for the different levels of the software delivery chain the invention offers at least the following advantages:

Provides a trustworthy and efficient software distribution system that combines the advantages of online distribution and factory loading;

Generates more revenue by enforcing the "one license, one computer" rule; and

Opens new areas of software supply mechanisms, through the use of specialized tokens allowing, for example, leasing, pay per use, time bound promotions, and volume licenses.

Provide significant cost savings on manufacturing processes for fast and secure loading of operating systems and applications. A system implementing the invention does not require a third party contract for support because the processes can be more easily opened to resellers (because the system is not based on proprietary processes).

Provide significant cost savings on licensing for those licenses that are not required by our customers, i.e. where a system is loaded with win9X when the customer wants Windows for Workgroups.

Lower the cost of the computer platform, provided that a computer vendor can ship personal computers without operating systems. This increases efficiency in loading software, and in providing a lawful process for loading a complete customer image, including a full operating system in a one step manufacturing process.

Help to reduce TCO by strictly enforcing the one license, one computer rule, and by making personal computers system management ready, thereby further reducing the cost of installing applications on new personal computers.

Provide in-house availability of a large software repository that can be constantly updated.

Provide better turn-around time because of the improved efficiency of the software suppliers.

The user pays only once for the operating system.

Provide security features at a marginal incremental cost.

Provide the ability to use corporate tools while still complying with EULAs.

The personal computer can be more trusted because of the security features (safe box, encryption) included therein.

Provide simple installation, i.e. open the box, plug the computer to the corporate network and start using it in a few minutes.

Figure 2:
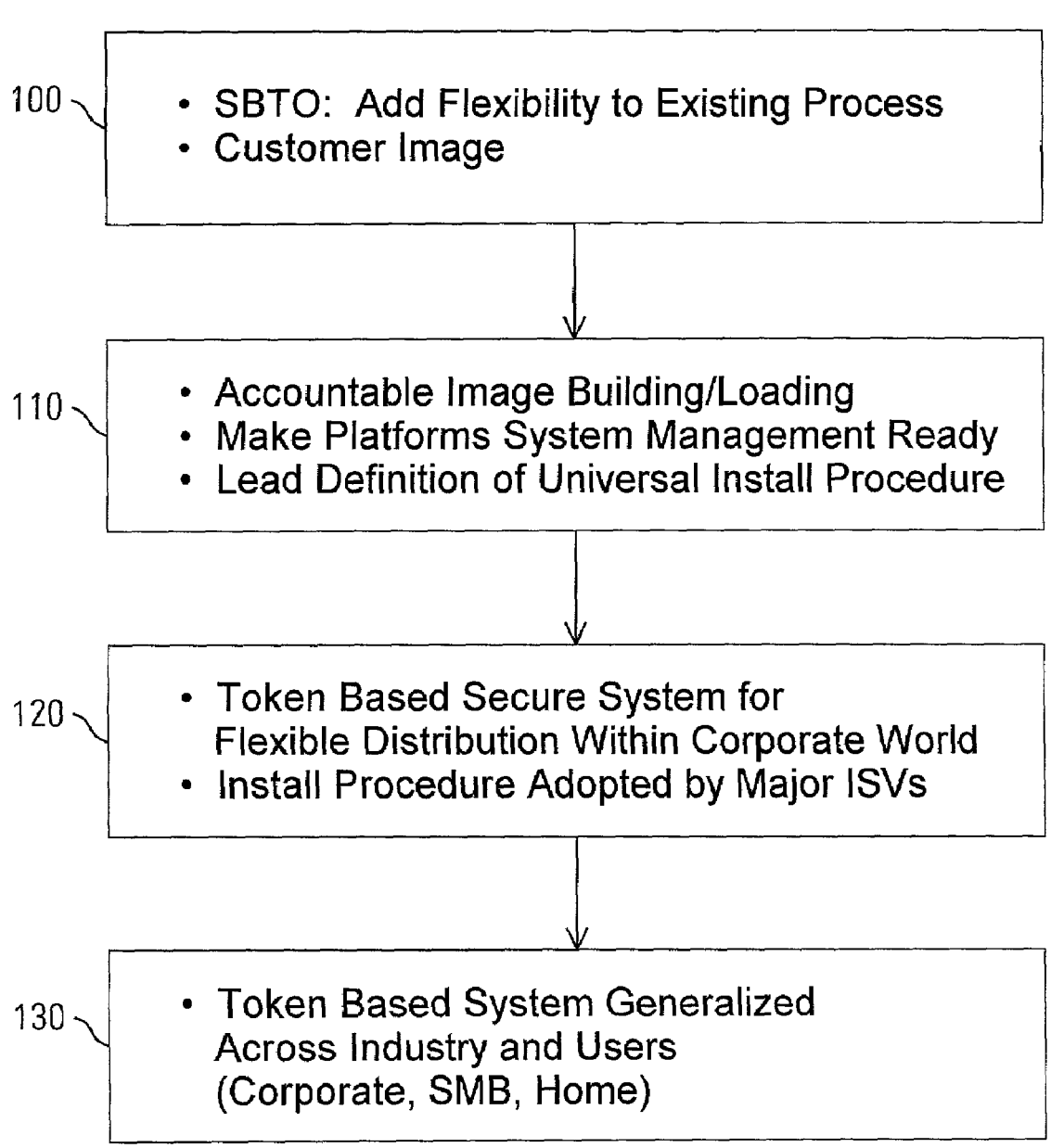
FIG. 2 is a block schematic diagram showing a development timeline for implementing a token based software distribution scheme according to the invention.

FIG. 2 is a flow diagram showing a development timeline for implementing a token based software distribution scheme according to the invention. The deployment of such a technology typically follows a progressive path, from regular distribution centers and channel assembly partners to small and medium size businesses.

First Step (100): The first step provides added flexibility to existing proprietary manufacturing processes, which are designed to handle static bundles and cannot process dynamic combinations of software. This allows for Software Build To Order (SBTO) by dynamically transforming a set of software component requirements into a list of to-be-loaded software. A second feature manages customer images as a temporary solution for counting and reporting licenses of software included within the image in a secure environment (distribution centers and current channel assembly partners).

Second Step (110): The second step first provides an accountable image building/loading system using the herein described security mechanisms. When a customer order is processed, a token is requested from a token server. The token is consumed by the image builder/leader and used to duplicate the exact number of copies of software corresponding to that order. A secure hardware element ensures that the image loading/building process cannot be tampered with and that only the correct number of software licenses granted by the token are issued. Current protection mechanisms already in place in the distribution centers and at channel assembly partners are used to guarantee end to end security. This protection mechanism resides in a confidential software building procedure and in a flag implemented in a serial EEPROM that makes the manufactured personal computer inoperable until all the manufacturing processes have been executed.

A second objective of this second step is to make personal computer clients system management software ready to use such that new personal computers only need to be plugged into the corporate network, and automatically download additional software from a system management server. This can be readily achieved by pre-loading system management software clients at the factory. Usually, system management software is not pre-installed on new personal computer clients, and the IT organization must load it, which may induce several days of delay and drastically increase the cost of deploying a new per computer within the organization.

A third objective of the second step is to lead the definition of an industry-wide standard for software setup and install procedures. Even though tools such as Installshield from Install Shield Software Corporation, Schaumburg, Ill. are used in the industry, setup procedures may vary significantly from one ISV or independent hardware vendor (IHV) to the other. This increases cost, introduces quality problems, and delays the time to market for OEM vendors.

At completion of the second step, the token system guarantees an exact count of software licenses preloaded on the personal computer at manufacturing, and therefore clears the gray area practices of non-legally covered software loading, as described above. Protection against software piracy is provided by the nondisclosure of the proprietary software loading processes. However, those processes cannot be deployed in a nonsecure environment, and do not offer the flexibility and generalization capabilities for a broad deployment to all levels of the delivery chain, including second tier resellers or corporate customers.

Third Step (120): Trustworthy software duplication in a non-secure environment, that provides a widely deployable manufacturing process. One objective of the third step is to provide replication processes based on industry standard installation procedures that are secure enough such that their deployment can occur in non-trusted environments. The duplication control mechanisms have no effect on the end-user experience because the control is performed at manufacturing time.

The install procedures are preferably those that are the de facto standards.

In this embodiment of the invention, security is provided by:

Encrypting the standard software components, e.g. CAB files.

Upon receipt of the duplication token:
  Decrypting appropriate software components partially or fully supported by a hardware security device;
  Creating an image protected with core technologies, such as touch points; and
  Binding a tamper resistant hardware ID associated with the personal computer to the image.

When the end user starts the software for the first time, the image is processed within a trusted component, and upon the agreement of the EULA, to make it fully operational and usable. A non-erasable certificate is produced, which is a proof that the software has been installed on that particular platform.

This process is inherently secure from the component base download to the first time use of the software and relies on standard install procedures rather than proprietary systems. It is therefore much more trustworthy and scalable.

The process requires a secure component embedded into the personal computer client that is able to insure trustworthy encryption/decryption and signature/hash functions. The same secure component can be used as a generic encryption integrated circuit or hardware module to provide hardware based security. However, this does not prevent software piracy at the client personal computer level because one can always take an image of the disk once the EULA has been agreed upon and the image as been processed and duplicate the image at will. To avoid this problem, the invention provides unforgeable proof that the image has been bound to a given personal computer, i.e. a credential.

Fourth Step (130): A complete software usage control system, i.e. an end user oriented system, is provided. One objective of this final stage is to ensure that an application, once securely pre-loaded onto the personal computer cannot be duplicated and used on another personal computer.

When an application is launched, a secure process intercepts the application calls, verifies the application certificate signature and checks that the hardware identification (HW-ID) contained in the certificate matches that of the personal computer, verifies the authenticity of the application, and creates a credential to be used for the application monitoring. Additional levels of control can be achieved by including critical functions under the direct control of a policy activation token. This is also an excellent mechanism for detecting viruses because the system cannot activate images that have been modified.

To be trustworthy, the secure process must establish a trust relationship with the secure component. It also must not be possible to bypass the secure process and launch an application without monitoring such activity. Only a modification of the operating system can make this possible. The fourth step provides a very strong antipiracy system. When the application certificate is bound to a number of computers, e.g. an office, a home, or a laptop computer, and is portable (e.g. implemented on a smart card), Step 4 provides a solution for using office applications on multiple platforms with a consistent environment while complying with an EULA.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method for uniquely and securely loading software to an individual computer, comprising:

requesting download of software components to a hardware platform;

delivering a policy activation token from a token server responsive to said request, wherein said token server is operated by an entity having rights to grant access to said software components;

passing said policy activation token to a system that builds software images, wherein said system is operated by an organization that performs delivery of said software;

assembling and decrypting said software components with said system within an enabled secure process;

creating a software image to be loaded onto said platform; and binding said software image to said hardware platform by encrypting said software image using an application specific encryption technique.

2. The method of claim 1, further comprising providing a report from said entity that issued said policy activation token to a proprietor of said software components.

3. The method of claim 1, further comprising:

clearing a protection mechanism within a trusted component of said hardware platform on which said software components are to run; and creating an unerasable credential which records that said software components have been successfully installed;

wherein said clearing and creating steps are implemented when a user uses said software components for a first time.

4. The method of claim 1, further comprising providing a dynamic process which checks that said software components are both genuine and bear a valid certificate each time said software components are used in conjunction with said hardware platform.

5. The method of claim 1, where said policy activation token comprises an electronic file which is physical evidence of a license agreement; and wherein said software components become usable only when said policy activation token is present.

6. The method of claim 1, wherein said policy activation token is delivered as part of a financial transaction.

7. The method of claim 1, further comprising downloading said software image to said hardware platform.

8. The method of claim 1, further comprising providing said software image to a customer.

9. The method of claim 5, wherein said policy activation token follows a separate path from that of said software components.

* * * * *

UNITED STATES PATENT AND TRADEMARK OFFICE
CERTIFICATE OF CORRECTION

PATENT NO. : 7,055,040 B2 Page 1 of 1
APPLICATION NO. : 10/143080
DATED : May 30, 2006
INVENTOR(S) : Keith S. Klemba et al.

It is certified that error appears in the above-identified patent and that said Letters Patent is hereby corrected as shown below:

In column 7, line 55, delete "per" and insert -- personal --, therefor.

In column 10, line 9, in Claim 3, delete "unerasable" and insert -- un-erasable --, therefor.

Signed and Sealed this

Fourth Day of August, 2009

JOHN DOLL
*Acting Director of the United States Patent and Trademark Office*